US008857431B2

(12) United States Patent
Gillotin et al.

(10) Patent No.: US 8,857,431 B2
(45) Date of Patent: Oct. 14, 2014

(54) BREATHING MASK WITH OXYGEN REDUCED CONSUMPTION

(75) Inventors: Vincent Gillotin, Vauhallan (FR); Michel Malfroy, Vantoux (FR); Remy Schoettel, Saint Vit (FR); Patrick Maire, Raizeux (FR)

(73) Assignee: Zodiac Aerotechnics, Plaisir (FR)

( * ) Notice: Subject to any disclaimer, the term of this patent is extended or adjusted under 35 U.S.C. 154(b) by 354 days.

(21) Appl. No.: 12/743,835

(22) PCT Filed: Nov. 21, 2007

(86) PCT No.: PCT/IB2007/055391

§ 371 (c)(1), (2), (4) Date: May 20, 2010

(87) PCT Pub. No.: WO2009/066134

PCT Pub. Date: May 28, 2009

(65) Prior Publication Data

US 2010/0269833 A1 Oct. 28, 2010

(51) Int. Cl.

| | |
|---|---|
| ***A62B 7/04*** | (2006.01) |
| ***F16K 31/26*** | (2006.01) |
| ***B64D 11/00*** | (2006.01) |
| ***B64D 13/00*** | (2006.01) |
| ***A62B 9/02*** | (2006.01) |

(52) U.S. Cl.

CPC ..................................... *A62B 9/022* (2013.01)
USPC ............... 128/204.26; 128/204.29; 244/118.5

(58) Field of Classification Search

CPC ................................ A62B 9/027; A62B 9/022
USPC ............. 128/200.24, 201.28, 202.27, 204.18, 128/204.19, 204.21, 204.22, 204.24, 128/204.25, 204.26, 204.27, 204.28, 128/204.29, 205.11, 205.24, 205.25, 128/206.21, 207.12; 244/118.5; 137/81.1, 137/908; 251/94

See application file for complete search history.

(56) References Cited

U.S. PATENT DOCUMENTS 4,858,606 A * 8/1989 Hamlin .................... 128/204.29
6,796,306 B2 9/2004 Martinez (Continued)

FOREIGN PATENT DOCUMENTS

| | | |
|---|---|---|
| FR | 2781381 | 1/2000 |
| FR | 2827179 | 1/2003 |
| WO | WO-2006005372 | 1/2006 |

(Continued)

OTHER PUBLICATIONS

PCT/IB2007/055391 International Search Report and Written Opinion dated Sep. 22, 2008.

*Primary Examiner* — Tan-Uyen T Ho
*Assistant Examiner* — Mark K Han
(74) *Attorney, Agent, or Firm* — Kilpatrick Townsend & Stockton LLP; Dean W. Russell, Esq.; Kristin M. Crall, Esq.

(57) ABSTRACT

Embodiments of the invention provide a breathing mask for aircraft crewmember. The breathing mask includes an on-demand regulator with an inlet connected to a source of breathing gas and an outlet to exhaust the breathing gas. The outlet has an aperture controlled by a movable valve having an open position when the crewmember breathes out and a closed position when the crewmember breathes in. The breathing mask also has a latch member operable by a crewmember to latch the valve in the open position, the latch member including an unlocking member to release the valve when the cabin pressure is below a predetermined value.

25 Claims, 5 Drawing Sheets

(56) References Cited

U.S. PATENT DOCUMENTS

| | | | | |
|---|---|---|---|---|
| 6,994,086 | B1 | 2/2006 | Martinez et al. | |
| 7,584,753 | B2 * | 9/2009 | Aubonnet et al. ....... | 128/204.25 |
| 7,836,886 | B2 * | 11/2010 | McDonald et al. ...... | 128/205.25 |
| 2007/0084469 | A1 | 4/2007 | McDonald et al. | |

FOREIGN PATENT DOCUMENTS

| | | |
|---|---|---|
| WO | WO-2007121770 | 11/2007 |

* cited by examiner

BREATHING MASK WITH OXYGEN REDUCED CONSUMPTION

CROSS REFERENCE TO RELATED APPLICATION

This application is the U.S. national phase of International Application No. PCT/IB2007/055391 filed on Nov. 21, 2007, and published in English as International Publication No. WO2009/066134 A1 on May 28, 2009, the entire contents of which are incorporated herein by reference.

FIELD OF THE INVENTION

The invention relates to the field of breathing mask for aircraft crew members and passengers.

BACKGROUND OF THE INVENTION

To ensure the safety of the passengers and crewmembers in case of a depressurization accident or the occurrence of smoke in the aircraft, aviation regulations require on board all airliners a safety oxygen supply circuit able to supply each passenger and crewmember with an oxygen flow rate which is function of the cabin altitude.

A mask and harness system is used to provide breathing oxygen. The mask system has a face seal, a pneumatically-actuated harness, and a regulator to control the flow of oxygen. The regulator comprises an inlet connected to an oxygen source and an outlet to exhaust the breathed gas outside. The outlet aperture is controlled by a movable valve so that the valve is in an open position when the crewmember breathes out and is in a closed position when the crewmember breathes in.

The system is designed for a required five-second donning with one hand.

Such breathing mask is well-known in the art as an on-demand breathing mask. The demand regulators of these breathing masks are known from the documents FR 2,781,381 or FR 2,827,179 disclosing a pneumatic demand regulator, or from WO2006/005372 disclosing an electro-pneumatic demand regulator.

However, aviation regulation often requires that at least one crewmember of an airplane wears permanently a breathing mask when the airplane cruises above a predetermined altitude so that, in case of an abrupt depressurization of the cabin, the crewmember can continue to control the airplane.

But the conventional on-demand breathing mask generates an inhalation resistance and, therefore, an increased work of breathing which results in fatigue and discomfort. This problem becomes more acute when the breathing mask must be worn permanently for many hours.

Another problem is related to the oxygen consumption generated by the permanent use of the breathing mask.

To solve, at least partially, these problems, the applicant has disclosed in the patent application having the filing number QT/EP2006/004586 a breathing mask of the above type in which an auxiliary channel is used to connect the face seal of the breathing mask to the ambient air so that there is no sufficient reduction of pressure inside the breathing mask to cause the regulator to dispense oxygen. A means is supplied to regulate flow through the auxiliary channel. The regulating means has a closed position in which flow is blocked and an open position in which flow is enabled. A biasing force is applied to the flow regulating means to maintain it in the closed position. The user may manually move the flow regulating means into the open position where a latch is deployed to maintain the flow regulating means in the open position. The latch may subsequently be released by the user when desired to revert the flow regulating means to the closed position. A pressure sensing means releases automatically the latch upon decrease in the cabin pressure, allowing the flow regulating means to revert to the closed position without action of the user upon such a decrease in cabin pressure.

However, such auxiliary channel has the inconvenience to modify substantially the breathing mask and to increase its complexity.

SUMMARY OF THE INVENTION

It would be advantageous to achieve a breathing mask with reduced oxygen consumption which has some simple mechanisms to be easy to manufacture and to maintain.

To better address one or more concerns, in a first aspect of the invention a breathing mask for aircraft crewmember comprising an on-demand regulator, said regulator comprising an inlet connected to a source of breathing gas and an outlet to exhaust the breathing gas, said outlet having an aperture controlled by a movable valve having an open position when the crewmember breathes out and a closed position when the crewmember breathes in, wherein said breathing mask comprises latch means operable by said crewmember to latch said valve in the open position, said latch means comprising an unlocking means to release said valve when the cabin pressure is below a predetermined value.

Advantageously, the breathing mask uses a valve already existing in on-demand regulator to add the function of air opening during normal mode of flight. Therefore, the breathing mask has a reduced complexity which increases the mask reliability and reduces its cost.

A second advantage of the integration in the on-demand regulator of a latch means to maintain the valve in the open position is the capability to link the release of the latch means and a change in another mode of the regulator, for instance, the so-called "100% mode" in which the user breathes in pure oxygen or the "emergency" mode in which the user must not inhale the cabin air and therefore the mask cavity is over pressurized compared to the cabin pressure. Therefore, there is no risk that the mask is set up in two simultaneous non compatible modes.

In particular embodiments:

- said unlocking means comprises an aneroid capsule that changes in length in response to change in the cabin pressure, said length change actuating a linkage to release said valve,
- said latch means comprises a first lever having a position in which said lever latches said valve in the open position, said first lever being moved to said position by a button actuated by the crewmember and said first lever being locked in said position by second lever actuated by a spring,
- said second lever is rotating around an axis, the spring and the aneroid capsule (48) being on each side of the lever to generate opposing forces,
- said latch means comprises an electromagnet and said valve comprises a magnetic part such that the electromagnet maintains said valve in the open position by a magnetic field,
- said electromagnet is powered by an electrical circuit and said unlocking means comprises an aneroid capsule adapted to open said electrical circuit when the cabin pressure is below a predetermined value, said electromagnet is movable by the crew member from a first position far from the valve to a second position near the valve, the electromagnet is hold in the first position by a spring, said latch means comprises a magnet and said valve comprises a magnetic part such that the electromagnet maintains said valve in the open position by a magnetic field, said unlocking means comprises an aneroid capsule adapted to push away the magnetic part from the magnet when the cabin pressure is below a predetermined value, said latch means comprises a support wheel with flexible fingers, said fingers having a distal end movable between a first position in which said movable valve is free to move and a second position which maintains said movable valve in open position; and said latch means further comprises a rotating ratchet acting as a cam to transform the rotary movement of the ratchet to a translation movement of the fingers between the first and second position, the unlocking means are automatically activated when the crew member selects another use mode of the regulator.

Therefore, the breathing mask has the advantage of being easily calibrated through the spring strength. Another advantage is afford by the integration of the locking means within the regulator: the manual selector of use mode can be connected to the latch means. Therefore, when the user selects another mode, this "oxygen-saving" mode is automatically disabled. Depending on the type of on-demand regulator, a particular embodiment may be preferred as easier to adapt. Aspects of these particular embodiments may be combined or modified as appropriate or desired, however.

These and other aspects of the invention will be apparent from and elucidated with reference to the embodiment described hereafter in relation with annexed figures where:

Figure 1:
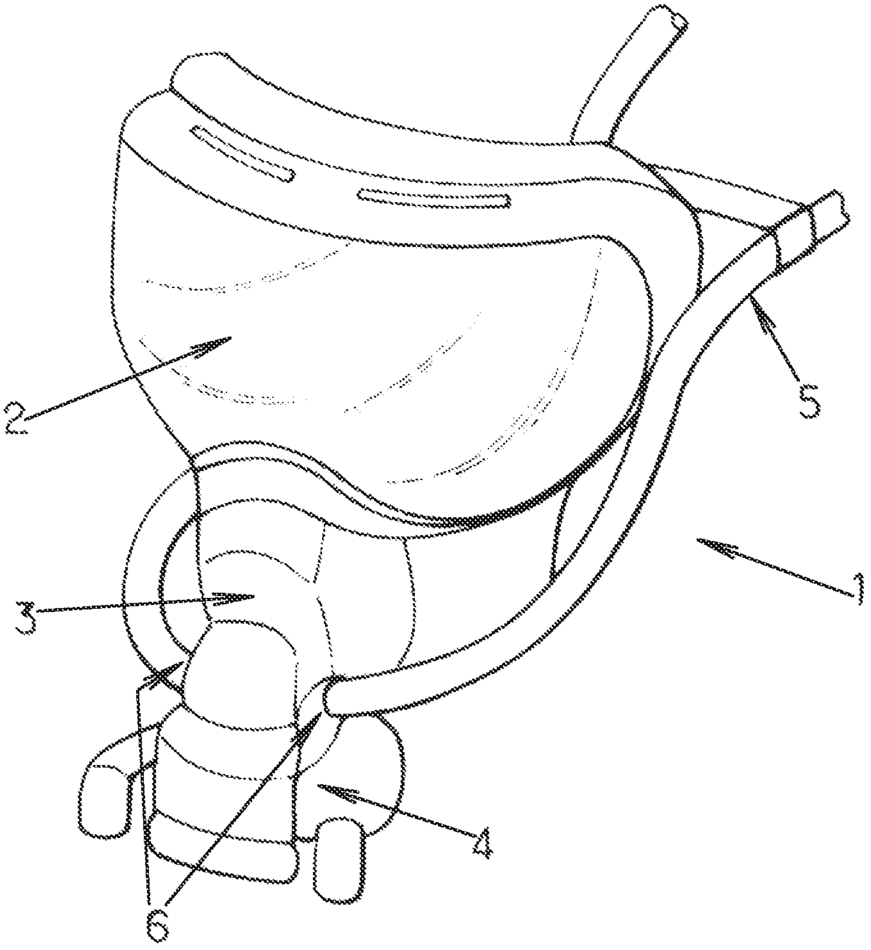
FIG.1. (PRIOR ART)
FIG. 1 is a perspective view of a breathing mask known in the art.

In reference to FIG. 1, a breathing mask 1 comprises a glass 2 fixed to a rigid portion 3. The rigid portion has a form adapted to be fit against the face of a user and comprises an on-demand regulator 4 to bring a breathable gas to the user. The breathing mask comprises also an extensible harness 5 having end portions 6 connected to the rigid portion.

The on-demand regulator 4 will not be described in details here except for the parts directly related to the described embodiment of the invention. If necessary, the above applications contain a complete description of an on-demand regulator.

Figure 2:
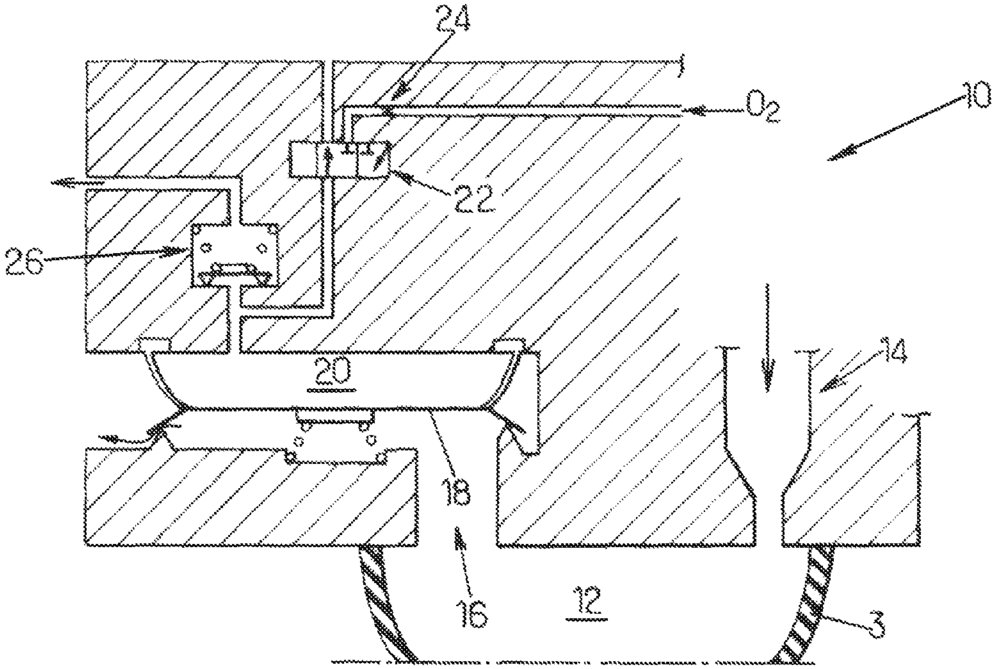
FIG. 2. (PRIOR ART)
FIG. 2 is a schematic view of a part of an on-demand regulator of the prior art.

In reference to FIG. 2, a portion 10 housing of the regulator is connected to the face seal 3 defining a chamber 12 surrounding the nose and mouth of the crewmember. The chamber 12 is connected to a source of breathing gas through an inlet 14. The on-demand regulator 4 controls the flow of breathing gas and its ratio of oxygen content through a mechanism not represented but well known in the art.

The portion 10 also defines a breathe-out path 16, or outlet, including an exhalation or breathe-out valve 18. The shutter element of the valve 18 shown is of a type that is in widespread use at present for performing the two functions of acting both as a valve for piloting admission and as an exhaust valve. In the embodiment shown, it acts solely as a breathe-out valve while making it possible for the inside of the mask to be maintained at a pressure that is higher than the pressure of the surrounding atmosphere by increasing the pressure that exists in a chamber 20 defined by the valve 18 to a pressure higher than ambient pressure. The valve 18 moves between an open position and a closed position, depending on the difference of pressure between the chamber 20 and the mask chamber 12.

In a first state, an electrically-controlled valve 22 (specifically a solenoid valve) connects the chamber 20 to the atmosphere, in which case breathing occurs as soon as the pressure in the mask exceeds ambient pressure. In a second state, the valve 22 connects the chamber 20 to the oxygen feed via a flow rate-limiting constriction 24. Under such circumstances, the pressure inside the chamber 20 takes up a value which is determined by a relief valve 26 having a rate closure spring.

Figure 3:
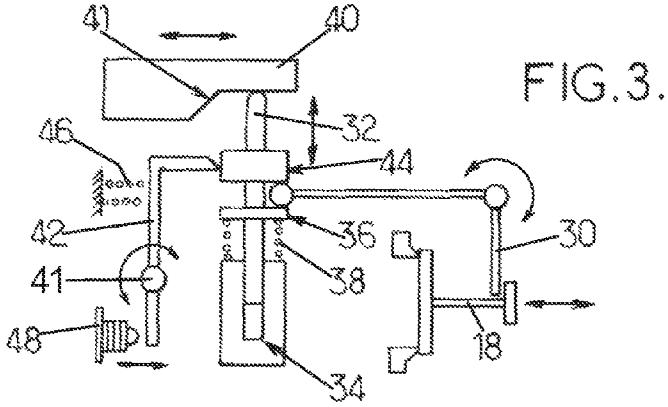
FIG. 3 is a functional view of a latching mechanism according to an embodiment of the invention.

In reference to FIG. 3, a rotating lever 30 is linked to the breathe-out valve 18. The arm of the lever 30 is guided by a pin 32 movable along its axis. A first end of the pin 32 slides into a fixed part 34 to guide the pin 32 in its longitudinal movement. The pin 32 comprises a first collar 36. A spring 38 is disposed between the fixed part 34 and the collar 36. A button 40 with a ramp 41 holds the second end of the pin 32.

A second lever 42 is rotating around an axis 41. On one side of the axis, a spring 46 pushes the lever along a second collar 44 of the pin 32. On the other side of the axis, the lever arm is controlled by an aneroid capsule 48.

When the user decides to put the breathing mask in a cruise mode in which he breathes the ambient air, without consumption of oxygen, he pushes the button 40 until the ramp 41 pushes down the pin 32. If the button 40 is of rotating type, the ramp 41 acts as a cam on the pin 32. The lever 42 pushed by the spring 46 latches the pin 32 in the down position. The movement of the pin 32 rotates the lever 30 until a position where the valve 18 is maintained in the open position.

As the valve 18 is always open, the mask chamber 12 is always connected to the cabin ambient air and, therefore, there is no pressure decrease to open the oxygen inlet and the user breathes an air with less resistance and which has the same characteristics than the cabin air in term of oxygen percentage, pressure, etc.

The button 40 goes back to its initial position when the user releases it but the pin 32 is maintained in the down position by the lever 42.

When the breathing mask is in the cruise mode and there is a depressurization of the cabin, the length of the aneroid capsule 48 increases due to the pressure decrease. This length increase pushes the lever 42 until it unlocks the pin 32 which returns to its initial position, moving the lever 30 to release the valve 18 so that the on-demand regulator starts to regulate the oxygen arrival.

The man skilled in the art understands that the spring 46 and the aneroid capsule 48 creates two opposite forces and, therefore, the spring strength must be chosen to push the lever to the latch position when the cabin pressure is above a predetermined level but to be less than the aneroid chamber strength when the cabin pressure decreases under the predetermined level.

It is particularly advantageous to use the spring 46 to calibrate the mechanism to the particularity of the aneroid capsule and the predetermined pressure as required by aviation regulations.

The level 42 is also manually operable to unlock the pin 32 through a button (not represented). This release button is advantageously attached to the control button of the regulator so that, when the user chooses a different mode than the cruise mode, the level 42 automatically releases the pin 32 and the valve 18 is unlocked and returns to its normal mode for use.

While the invention has been illustrated and described in details in the drawings and foregoing description, such illustration and description are to be considered illustrative or exemplary and not restrictive; the invention is not limited to the disclosed embodiment.

For instance, the button 40 may be a rotary button or other actuation mechanism.

Figure 4:
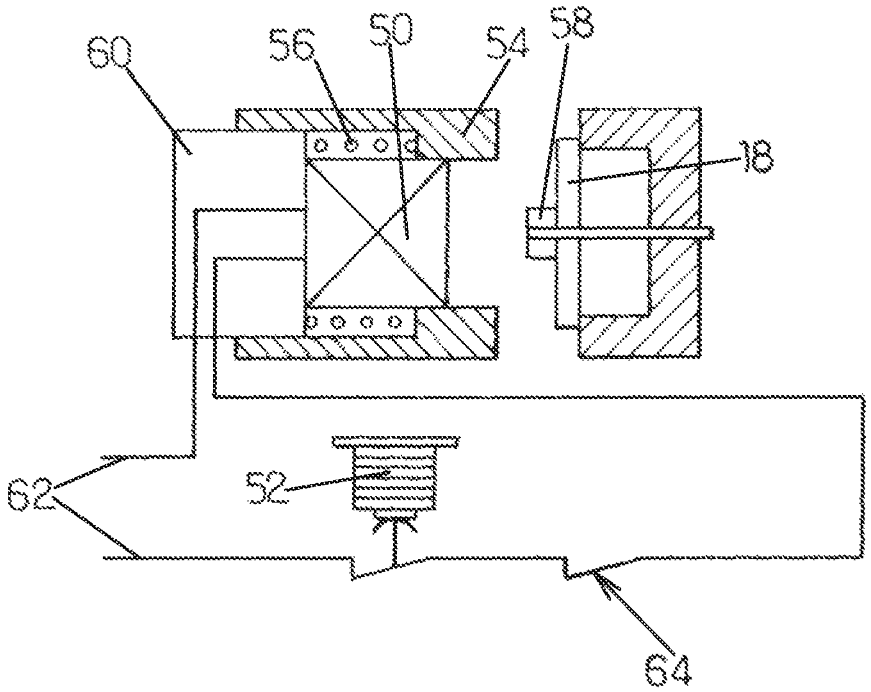
FIG. 4 is a schematic view of another embodiment of the invention.

In another embodiment, FIG. 4, the mechanism to hold the valve 18 in the open position is based on an electromagnet 50. The electrical current for the electromagnet is derived, for instance, from a microphone disposed in the breathing mask to allow the crewmember to speak with the other crewmembers and people of the air flight control, or from a specific electrical connection to the plane power supply.

The electromagnet 50 slides into a fixed part 54 and is hold apart from the valve 18 by a spring 56. The valve 18 contains a magnetic part 58 such as an iron-made pin. To start the cruise mode, the user pushes the electromagnet 50 toward the valve 18 by means of a button 60. As the valve 18 contains a magnetic part 58, when the electromagnet is near the valve 18, the valve 18 is stuck to the electromagnet by the magnetic field. As the user releases the button 60, the electromagnet returns to its initial position and maintains the valve 18 in the open position. To release the valve 18, the pressure sensing means 52, for instance an aneroid capsule, or the user, through a switch 64, needs only to suppress the magnetic field by opening the electric circuit 62.

Figure 5:
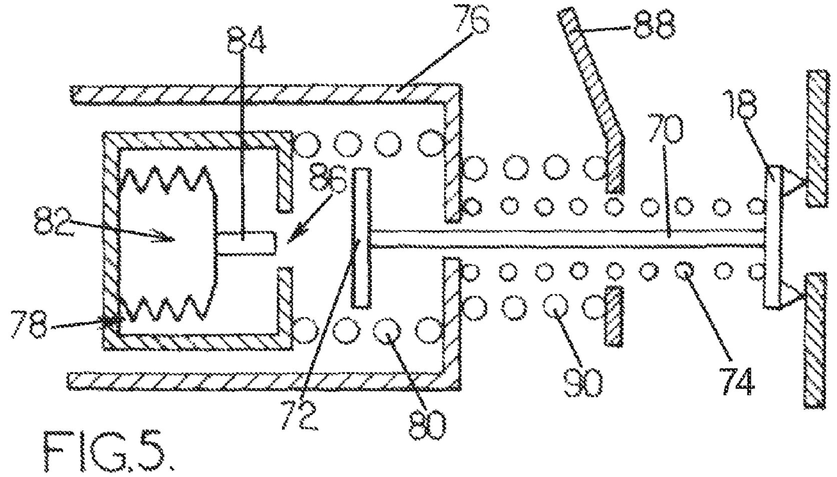
FIGS. 5, 6 and 7 are schematic views of a third embodiment of the invention.

In another embodiment, the electromagnet may be replaced by a magnet made of some magnetized material. Such an embodiment is disclosed in reference to FIGS. 5, 6 and 7. In normal mode, FIG. 5, the breathe-out valve 18 comprises a stem 70 with a magnetic area 72 on its opposite side. A spring 74, between the valve 18 and a fixed part 76, is calibrated to maintain the valve in its normal mode, i.e. to allow the valve to open when the user breathes out. A magnetic box 78 slides in the fixed part 76 and is pushed away of the magnetic area 72 by a second spring 80. The magnetic box 78 contains an aneroid capsule 82 with a small stem 84 to go out of the magnetic box through a hole 86 when the aneroid chamber increases its size due to pressure decrease. A lever 88 is maintained in an inactive position by a third spring 90.

Figure 6:
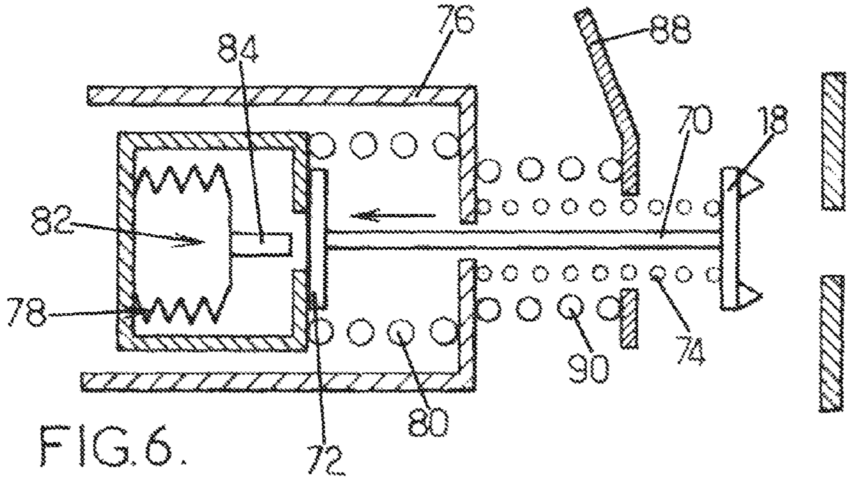

To put the regulator in cruise mode, FIG. 6, the user pushes the magnetic box 78 until the magnetic area 72 sticks to it. Then, the user releases the magnetic box which returns to its initial position with the pressure exercised by the spring 80, bringing with it the valve 18 which is maintained in open position.

Figure 7:
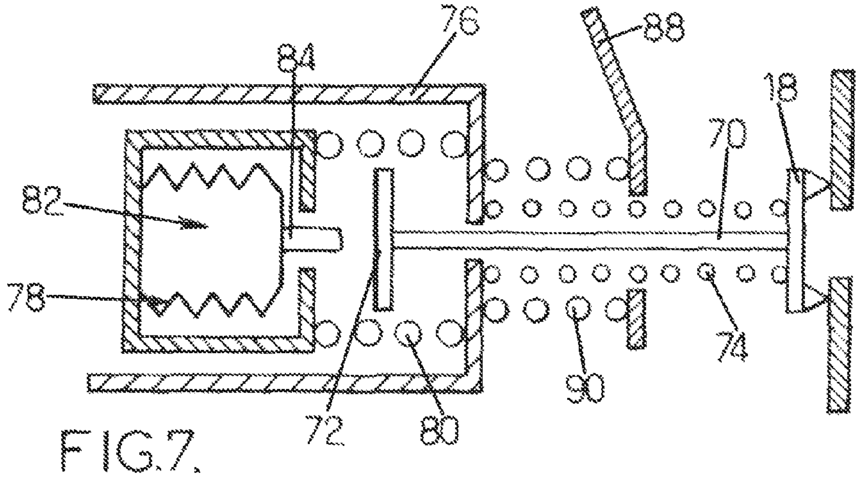

If the cabin pressure decreases below a predetermined level, FIG. 7, the aneroid capsule 82 size increases which pushes out the small stem 84 and the magnetic area 72 is unstuck from the magnetic box 78. The spring 74 pushes the valve 18 to its normal position.

If the user wants to return to the normal mode from the cruise mode, he pushes the lever 88 to unstick the magnetic area 72 from the magnetic box 78.

Figure 8:
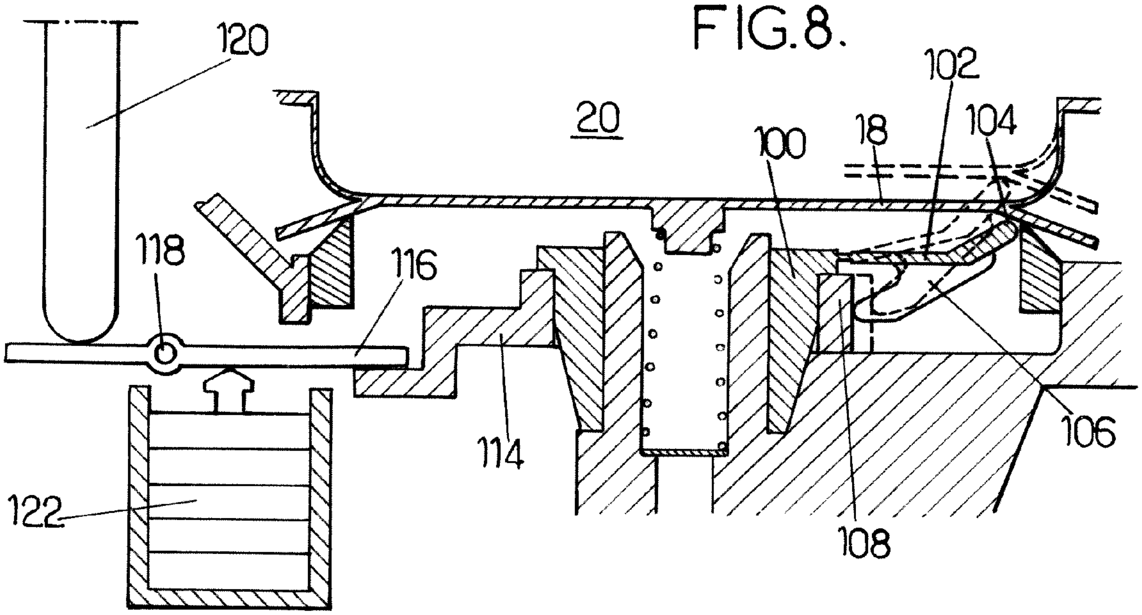
FIG. 8 is a sectional view of a fourth embodiment of the invention.
Figure 9:
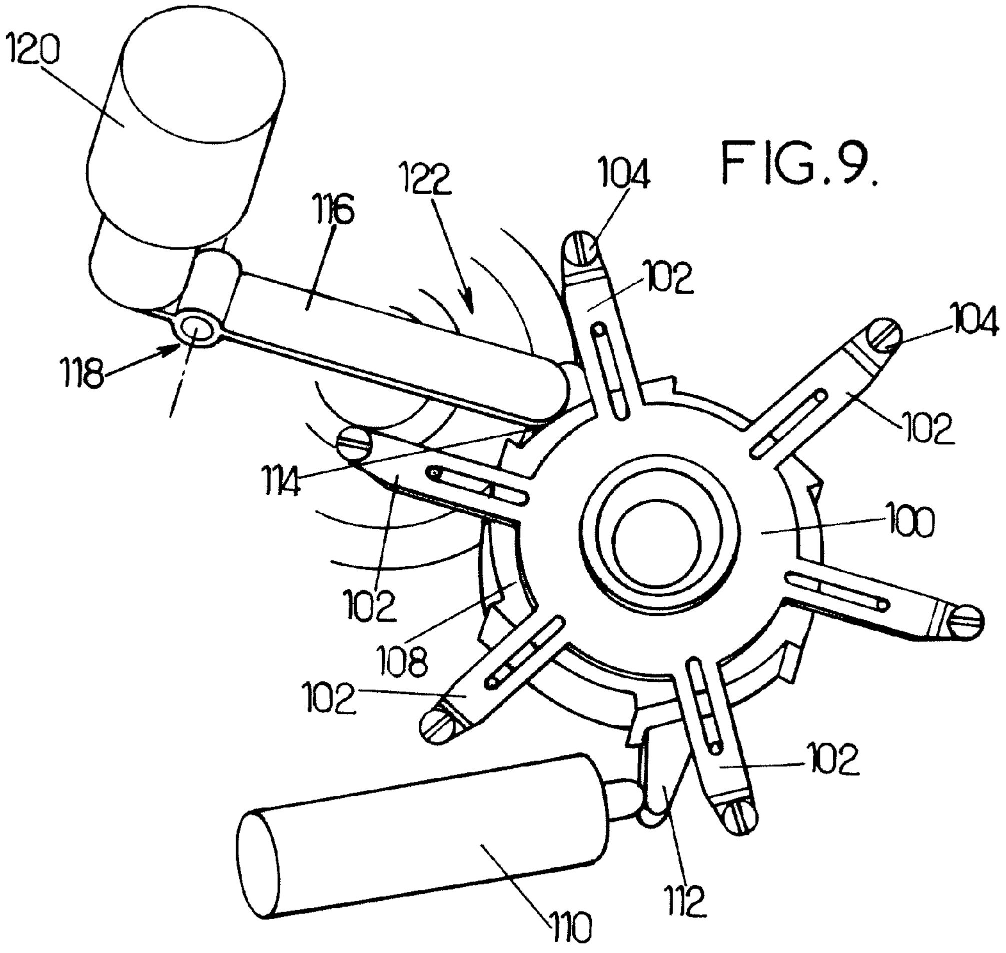
FIG. 9 is an isometric view of the embodiment of FIG. 8.

In FIGS. 8 and 9, the breathe-out valve 18 is shown in the same position than in FIG. 2 in relation with a fourth embodiment.

Around the same axis than the valve 18, a flexible support wheel 100 has a circular shape with 6 fingers 102.

At the distal end of each finger 102 from the wheel center, a semi-spherical area 104 contacts the valve 18 with reduced friction.

On each finger 102, a rigid transmission piece 106 connects the distal end with the external surface of a ratchet 108 so, when the wheel of the ratchet turns around the common axis of the valve 18 and of the flexible support wheel 100, the transmission piece 106 slides along the external surface of a teeth from a position near the axis to a position away of the axis. As each finger 102 is flexible but not elastic, this movement generates a vertical and upwards movement of the distal end of the finger and, therefore, the valve 18 is pushed up by the area 104.

The ratchet 108 is rotated through a pin 110 which pushes an arm 112 rigidly connected to the wheel 100 and is brought back to its initial position by a return spring (not represented).

A pawl 114 maintains the ratchet in the pushed position.

A lever 116 rotating around an axis 118 may be pushed by a pin pusher 120 or an aneroid capsule 122 to release the pawl 114 so that the ratchet 108 returns to its initial position.

Therefore, when the user wishes to put the regulator in the "zero-flow" or cruise mode, he pushes the button 110. The ratchet 108 acting as a cam transforms its rotational movement to a vertical movement of the distal ends of the fingers 102 pushing the valve 18 to an always open position.

The mechanism is maintained in this position by the pawl 114.

To release the system to its initial position, the user pushes the pin pusher 120 directly or, more preferably, through a manual selector (not represented) of the regulator use mode. The pin pusher 120 releases the pawl 114 through the lever 116.

Therefore, when the user selects the "emergency" mode or the "100%" mode, the pawl 114 is automatically released and the valve returns to its normal position.

The same lever is used to release the system when the cabin pressure is below a predetermined level through the aneroid capsule 122.

In a particular embodiment, the button 110 is attached to the arm 112 so that its other end may be used as a tactile indicator of the mode of the regulator.

Other variations to the disclosed embodiments can be understood and effected by those skilled on the art in practicing the claimed invention, from a study of the drawings, the disclosure and the appended claims. In the claims, the word "comprising" does not exclude other elements and the indefinite article "a" or "an" does not exclude a plurality.

The invention claimed is:

1. A breathing mask for an aircraft crewmember, comprising an on-demand regulator, said regulator comprising an inlet connected to a source of breathing gas and an outlet to exhaust breathed-out gas, said outlet having an aperture controlled by a movable valve having an open position when the crewmember breathes out and a closed position when the crewmember breathes in, wherein said breathing mask comprises a latch member operable by said crewmember to latch said valve in the open position, said latch member comprising an unlocking member to release said valve when the cabin pressure is below a predetermined value.

2. The breathing mask according to claim 1, wherein said unlocking member comprises an aneroid capsule that changes in length in response to change in the cabin pressure, said length change actuating a linkage to release said valve.

3. The breathing mask according to claim 2, wherein said latch member comprises a first lever having a first position in which said first lever latches said valve in the open position, said first lever being moved to said first position by a button actuated by the crewmember and said first lever being locked in said first position by a second lever actuated by a spring.

4. The breathing mask according to claim 3, wherein said second lever is rotatable around an axis, the spring and the aneroid capsule being on each side of the second lever to generate opposing forces.

5. The breathing mask according to claim 1, wherein said latch member comprises an electromagnet and said valve comprises a magnetic part such that the electromagnet maintains said valve in the open position by a magnetic field.

6. The breathing mask according to claim 5, wherein said electromagnet is powered by an electrical circuit and said unlocking member comprises an aneroid capsule adapted to open said electrical circuit when the cabin pressure is below the predetermined value.

7. The breathing mask according to claim 5, wherein said electromagnet is movable by the crewmember from a first position far from the valve to a second position near the valve.

8. The breathing mask according to claim 7, wherein the electromagnet is held in the first position by a spring.

9. The breathing mask according to claim 1, wherein said latch member comprises a magnet and said valve comprises a magnetic part such that the magnet maintains said valve in the open position by a magnetic field.

10. The breathing mask according to claim 9, wherein said unlocking member comprises an aneroid capsule adapted to push away the magnetic part from the magnet when the cabin pressure is below the predetermined value.

11. A breathing mask for an aircraft crewmember, comprising:

an on-demand regulator, said regulator comprising an inlet connected to a source of breathing gas and an outlet to exhaust breathed-out gas, said outlet having an aperture controlled by a movable valve having an open position when the crewmember breathes out and a closed position when the crewmember breathes in, wherein the breathing mask comprises a latch member operable by the crewmember to latch the valve in the open position, the latch member comprising an unlocking member to release the valve when the cabin pressure is below a predetermined value, and wherein said latch member comprises a support wheel with flexible fingers, said fingers having a distal end movable between a first position in which said valve is free to move and a second position which maintains said valve in the open position; and said latch member further comprises a rotating ratchet acting as a cam to transform a rotary movement of the ratchet to a translation movement of the fingers between the first and second position.

12. A breathing mask for an aircraft crewmember, comprising:

an on-demand regulator, said regulator comprising an inlet connected to a source of breathing gas and an outlet to exhaust breathed-out gas, said outlet having an aperture controlled by a movable valve having an open position when the crewmember breathes out and a closed position when the crewmember breathes in, wherein the breathing mask comprises a latch member operable by the crewmember to latch the valve in the open position, the latch member comprising an unlocking member to release the valve when the cabin pressure is below a predetermined value, and wherein the unlocking member is automatically activated when the crewmember selects another use mode of the regulator.

13. A breathing mask according to claim 12, wherein:

the regulator has a plurality of use modes including a cruise mode that allows breathing of ambient air, and the unlocking member is automatically activated when the crewmember selects one of the plurality of use modes apart from the cruise mode of the regulator.

14. A breathing mask for an aircraft crewmember, comprising an on-demand regulator, said regulator comprising an inlet connected to a source of breathing gas and an outlet to exhaust breathed-out gas, said outlet having an aperture controlled by a movable valve having an open position when the crewmember breathes out and a closed position when the crewmember breathes in, wherein said breathing mask comprises latch means operable by said crewmember to latch said valve in the open position, said latch means comprising an unlocking means to release said valve when the cabin pressure is below a predetermined value.

15. The breathing mask according to claim 14, wherein said unlocking means comprises an aneroid capsule that changes in length in response to change in the cabin pressure, said length change actuating a linkage to release said valve.

16. The breathing mask according to claim 15, wherein said latch means comprises a first lever having a first position in which said first lever latches said valve in the open position, said first lever being moved to said first position by a button actuated by the crewmember and said first lever being locked in said first position by a second lever actuated by a spring.

17. The breathing mask according to claim 16, wherein said second lever is rotatable around an axis, the spring and the aneroid capsule being on each side of the second lever to generate opposing forces.

18. The breathing mask according to claim 14, wherein said latch means comprises an electromagnet and said valve comprises a magnetic part such that the electromagnet maintains said valve in the open position by a magnetic field.

19. The breathing mask according to claim 18, wherein said electromagnet is powered by an electrical circuit and said unlocking means comprises an aneroid capsule adapted to open said electrical circuit when the cabin pressure is below the predetermined value.

20. The breathing mask according to claim 18, wherein said electromagnet is movable by the crewmember from a first position far from the valve to a second position near the valve.

21. The breathing mask according to claim 20, wherein the electromagnet is held in the first position by a spring.

22. The breathing mask according to claim 14, wherein said latch means comprises a magnet and said valve comprises a magnetic part such that the magnet maintains said valve in the open position by a magnetic field.

23. The breathing mask according to claim 22, wherein said unlocking means comprises an aneroid capsule adapted to push away the magnetic part from the magnet when the cabin pressure is below the predetermined value.

24. The breathing mask according to claim 14, wherein said latch means comprises a support wheel with flexible fingers, said fingers having a distal end between a first position in which said movable valve is free to move and a second position which maintains said valve in the open position; and said latch means further comprises a rotating ratchet acting as a cam to transform a rotary movement of the ratchet to a translation movement of the fingers between the first and second position.

25. The breathing mask according to claim 14, wherein the unlocking means is automatically activated when the crewmember selects another use mode of the regulator.

* * * * *